Nov. 21, 1961 L. L. COLBERT ET AL 3,009,348
COMBINED BICYCLE PEDAL AND LOCK
Filed Nov. 12, 1957

United States Patent Office 3,009,348
Patented Nov. 21, 1961

3,009,348
COMBINED BICYCLE PEDAL AND LOCK
Lawrence L. Colbert, National Press Bldg., Washington, D.C., and William Colbert, 158 W. 58th St., New York, N.Y.
Filed Nov. 12, 1957, Ser. No. 695,826
9 Claims. (Cl. 70—227)

The object of this invention is the locking of bicycles to keep them from being stolen, in a more efficient manner than the usual application of a padlock to one of its wheels, so as to restrict movement thereof.

This invention is therefore designed to make the locking of bicycles more convenient.

This invention relates to a bicycle pedal but more specifically to a bicycle pedal combined with a lock having a projecting bolt built into the pedal.

One of the objects of the invention is to provide a bicycle pedal with a bolt lock which obstructs movement of one of the wheels thereof.

Another object is to provide a bicycle pedal with a locking bolt which is housed in the pedal body when in non-obstructing position.

Another object is to provide a bicycle pedal with a locking bolt which automatically projects between the spokes of a bicycle wheel when released from the pedal by the turning of a key in the lock.

Referring now to the drawing and specification,

Figure 1:
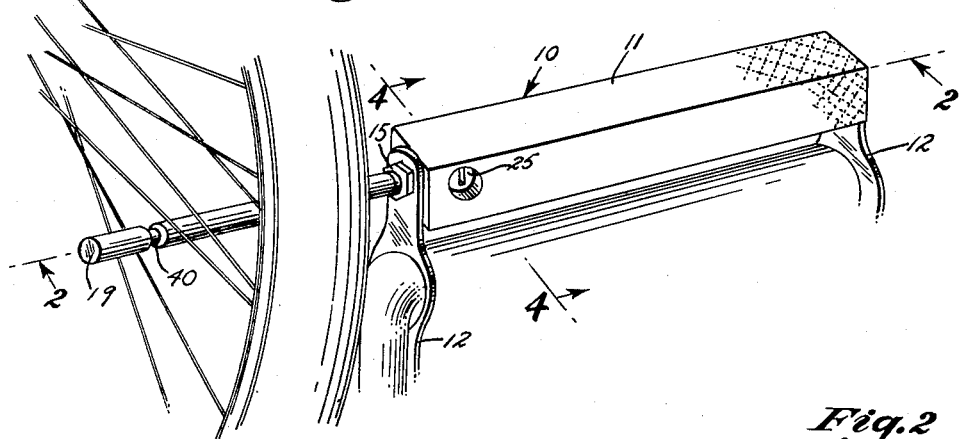
FIG. 1 is a perspective view partially showing a bicycle wheel and a pedal with the locking bolt in extended or obstructing position.
Figure 2:
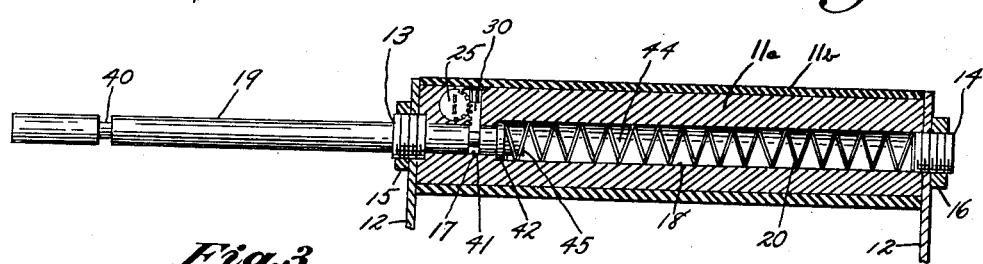
FIG. 2 is a side elevational view partially in section taken along the line 2—2 of FIG. 1.
Figure 3:
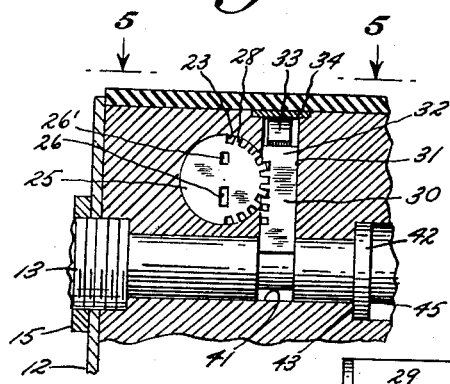
FIG. 3 is an enlarged sectional view of a portion of FIG. 2 showing details of the lock.
Figure 4:
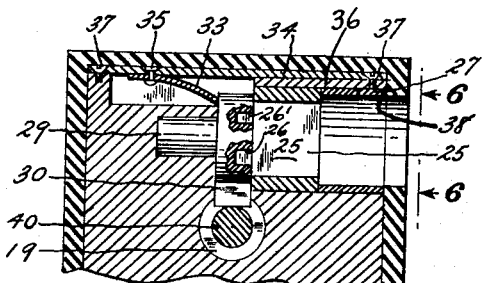
FIG. 4 is a sectional view taken along line 4—4 of FIG. 1.
Figure 5:
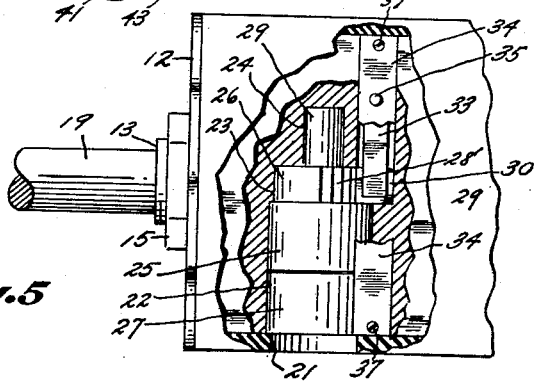
FIG. 5 is a partial sectional view taken along line 5—5 of FIG. 3.
Figure 6:
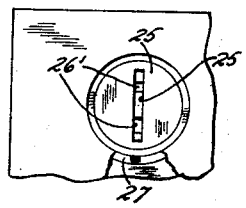
FIG. 6 is an enlarged elevational view showing more in detail than FIG. 1 the manner in which the plug fits into the pedal pad.

The pedal 10 comprises the usual two foot pads, one of which is shown at 11 and is attached to the pedal frame member 12 by two threaded bolts 13 and 14, and nuts 15 and 16, bolt 13 being longitudinally bored but bolt 14 is only partially bored. The pad consists of metal base 11a and rubber cover 11b. The pedal could of course be of the single foot pad type.

The pedal pad is bored at 17 in the side opposite to the bore 18 and is of smaller diameter, being substantially the diameter of the bolt 19 whereas bore 18 is made larger in order to accommodate both the bolt 19 and the helical spring 20. The pad is further bored at 21, 22, 23 and 24 to house the locking means for the bolt, bore 21 being through pad cover 11b only.

The lock is the rotating key slot type. The plug member 25 having key slot cylindrical extension member 26 with key slots 26' is mounted in the pedal pad 11. Adjacent the outer end of the plug is a cylindrical member 27 which serves as a bearing surface for the plug member 25. The plug may be provided with the usual tumblers (not shown). Gear teeth 28 are formed on cylindrical extension member 26. The plug has a further reduced cylindrical portion 29 integral with extension 26 and rotating in bore 24 and is a further bearing for the plug at its inner end.

A latch 30 is housed in a bore 31 in the pedal pad for reciprocal movement therein and includes a rack 32 which meshes with the gear teeth 28 of the plug 25. A flat spring 33 is anchored to plate 34 by rivets 35 or similar fasteners. The opposite end of the spring 33 presses on the top edge of the latch 30 to urge it downward in a normally locked position. The plate 34 to which spring 33 is anchored is embedded in the pedal pad and is reinforced by portion 36 of pad 11a to which it is attached by screw 37. Cylinder 27 is utilized to hold all of the locking parts in place, being itself held in place by shoulder 38 of pedal pad cover portion 11b.

The bolt 19 has a radial groove 40 and 41, the former being used to hold the bolt in retracted position when latch 30 is placed therein and the bolt in such position will not obstruct the movement of the bicycle wheel. When the latch is in groove 41 the bolt is held in extended or locking position so as to obstruct the movement of the bicycle wheel. Adjacent one end of the bolt is a disc like enlarged portion 42 which serves as a stop against shoulder 43 and also a guide through bore 44 in the pedal pad. On the same end of the bolt and beyond the disc 42 the bolt is provided with an extension 45 which is of the same diameter as the main portion of the bolt and is extended a sufficient distance so that it goes into the partially bored portion of threaded bolt 14 and thereby gives support to the pedal pad.

Having thus described our invention what we claim is:

1. A combined bicycle pedal and lock comprising a pedal pad having bores therein, a bolt for reciprocal movement in said bores and having a plurality of radial grooves therein, a plug having gear teeth, a latch including a rack for meshing with said gear teeth, said latch fitting into said bolt grooves for locking said bolt in a plurality of positions.

2. A combined bicycle pedal and bolt type lock comprising a pedal with a plurality of bores therein, a bolt longitudinally disposed in said bores for reciprocal movement therein, said bolt having a plurality of radial grooves, a geared plug housed in a bore in the pedal pad perpendicular to the bolt, a latch having a rack for meshing with said geared plug to obstruct said bolt.

3. A combined bicycle pedal and reciprocating bolt type lock comprising a pedal pad, a bolt, a coiled spring adjacent one end of said bolt, both of which are housed in said pad, said bolt having a plurality of radial grooves and a disc, said disc being a stop for said bolt and said spring, a latch for coacting with said grooves of said bolt to hold said bolt in different relative positions.

4. In combination a bicycle pedal and bolt type lock comprising a pedal pad, a bolt, locking means for said bolt, and a frame for said pad, said bolt having grooves and a disc and being mounted in said pedal pad for reciprocating movement therein, the pedal pad and frame being attached to each other by threaded bored bolts, one of said bolts being a bearing for said lock bolt and the other as a support for said lock bolt.

5. In combination, a bicycle pedal and bolt type lock comprising a pedal pad, a lock, and a frame for said pad, said lock being housed within said pedal pad and consisting of a geared rotating plug, a latch having a rack for meshing with the geared plug, a key slot, and a bolt having a plurality of radial grooves for receiving said latch, a disc on said bolt for stopping said bolt and a spring for projecting said bolt into obstructing position in relation to the spokes of a bicycle wheel when said latch is removed from one of the grooves of said bolt.

6. In combination with a bicycle pedal, a bolt type lock being housed within said pedal and comprising a geared plug, a latch having a rack for meshing with the gears of said plug, a bolt, a coil spring for projecting said bolt, said latch projecting into grooves of said bolt to lock said bolt in either an obstructing or unobstructed position in relation to the spokes of a bicycle wheel.

7. In combination with a bicycle pedal pad, a projecting bolt type lock, said lock being housed in said pedal pad and consisting generally of a plug, key slot, latch, and bolt, said bolt having grooves, a flat spring adjacent said latch for depressing same into said bolt grooves, a spring for projecting said bolt when said latch is released from said grooves upon rotation of said key slot and plug.

8. In combination with a vehicle traction wheel having an opening, a pedal pad and a lock, said lock having a projectable bolt housed within said pedal pad and lock means for holding said bolt in retracted position within said pedal pad and for holding said bolt in locking position in said opening in said wheel.

9. A pedal means in combination with a vehicle traction wheel having an opening therethrough, said pedal means being rotatable in a plane parallel to and spaced from said wheel means, lock means in said pedal means including a bolt having an extendible and a retractable position alignable with and positionable in said opening of said wheel to prevent relative rotation between said wheel and pedal means, and latch means for holding the bolt in said extendible position and in said retractable position.

References Cited in the file of this patent

UNITED STATES PATENTS

| | | |
|---|---|---|
| 609,127 | Stearns | Aug. 16, 1898 |
| 626,697 | Hart | June 13, 1899 |
| 640,905 | Hart | Jan. 9, 1900 |
| 1,428,649 | Miller | Sept. 12, 1922 |
| 2,334,442 | Salimbene | Nov. 16, 1943 |

FOREIGN PATENTS

| | | |
|---|---|---|
| 234,733 | Great Britain | June 4, 1925 |